(12) United States Patent
Fujita et al.

(10) Patent No.: US 8,771,512 B2
(45) Date of Patent: Jul. 8, 2014

(54) SEPARATION MEMBRANE MODULE

(75) Inventors: Suguru Fujita, Osaka (JP); Yoshinobu Takaki, Osaka (JP); Yoshihiro Asari, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 365 days.

(21) Appl. No.: 12/933,995

(22) PCT Filed: Oct. 7, 2008

(86) PCT No.: PCT/JP2008/068218
§ 371 (c)(1), (2), (4) Date: Sep. 22, 2010

(87) PCT Pub. No.: WO2009/118934
PCT Pub. Date: Oct. 1, 2009

(65) Prior Publication Data
US 2011/0024342 A1    Feb. 3, 2011

(30) Foreign Application Priority Data

Mar. 25, 2008 (JP) ................................. 2008-078395

(51) Int. Cl.
*B01D 63/06* (2006.01)

(52) U.S. Cl.
USPC ............ 210/321.79; 210/321.88; 210/321.64; 210/321.72; 210/456; 210/320; 210/184; 96/8

(58) Field of Classification Search
USPC ............. 210/321.64, 321.69, 321.72, 321.78, 210/321.79, 321.81, 321.87–89, 323.2, 184, 210/185, 252, 175; 96/6–10
See application file for complete search history.

(56) References Cited

U.S. PATENT DOCUMENTS 3,774,771 A  *  11/1973  Manjikian et al. ....... 210/321.87
4,732,673 A  *   3/1988  Dagard et al. ................ 210/247

(Continued)

FOREIGN PATENT DOCUMENTS

EP    203 862    12/1986
EP   1 563 894    8/2005

(Continued)

OTHER PUBLICATIONS

Supplemental European Search Report in European Patent Application No. 08 87 3553.

*Primary Examiner* — David C Mellon
*Assistant Examiner* — Pranav Patel
(74) *Attorney, Agent, or Firm* — Oblon, Spivak, McClelland, Maier & Neustadt, L.L.P.

(57) ABSTRACT

In a separation membrane module in a module main body, an upper horizontal partition plate forms an upper fluid channel, a lower horizontal partition plate forms a lower fluid channel, a plurality of vertical outer tubes are fixed between the upper horizontal partition plate and the lower horizontal partition plate, and vertical tubular membrane elements extend through the respective outer tubes with a gap. An upper end of the gap is in communication with the upper fluid channel and a lower end of the gap is in communication with the lower fluid channel. An upper end opening of each of the membrane elements is open to outside of the module main body and a lower end opening each of the membrane elements is closed. A vertical partition plate is provided in either the upper fluid channel or the lower fluid channel to form an inlet chamber and an outlet chamber.

8 Claims, 8 Drawing Sheets

(56) References Cited

U.S. PATENT DOCUMENTS

| | | | |
|---|---|---|---|
| 5,443,724 A * | 8/1995 | Williamson et al. | 210/323.2 |
| 7,790,030 B2 * | 9/2010 | Schwartz et al. | 210/323.1 |
| 2002/0153297 A1 * | 10/2002 | Bozenmayer | 210/232 |
| 2003/0121840 A1 * | 7/2003 | Pex et al. | 210/185 |
| 2004/0045893 A1 * | 3/2004 | Watanabe et al. | 210/321.79 |
| 2006/0011535 A1 * | 1/2006 | Ikeda et al. | 210/321.79 |
| 2007/0284307 A1 * | 12/2007 | Lin | 210/649 |
| 2008/0006571 A1 * | 1/2008 | Arnaud | 210/321.64 |

FOREIGN PATENT DOCUMENTS

| | | |
|---|---|---|
| JP | 51 73353 | 6/1976 |
| JP | 8-131782 | 5/1996 |
| JP | 10-216484 | 8/1998 |
| JP | 10 216484 | 8/1998 |
| JP | 2000 093762 | 4/2000 |
| JP | 2000-93762 | 4/2000 |
| JP | 2004-122083 | 4/2004 |
| JP | 2004 122083 | 4/2004 |
| JP | 2006-102616 | 4/2006 |
| JP | 2006 102616 | 4/2006 |
| JP | 2007-160238 | 6/2007 |
| JP | 2007 160238 | 6/2007 |
| JP | 2009-39654 | 2/2009 |
| WO | 2004 035182 | 4/2004 |

* cited by examiner

SEPARATION MEMBRANE MODULE

TECHNICAL FIELD

The present invention relates to a separation membrane module for dehydrating, for example, a mixed solution of water, organic solvent, and the like.

BACKGROUND ART

A zeolite crystal has small holes of about a molecular size in the crystal, and has a molecular sieve property selectively passing a molecule according to a size and a shape of the molecule of the zeolite. The zeolite is applied to a gas separation membrane, and a field of a reverse gasification permeability separation, a reverse osmosis separation, a gas sensor, and the like by utilizing the molecular sieve property. Above all, at present, there is paid attention to utilizing the zeolite membrane as a separation membrane separating an organic solvent or the like from the mixed solution of water, organic solvent, and the like.

As a module for separating the organic solvent by the separation membrane using the zeolite, for example, there is a module in which only the water content is passed through the membrane, and the organic solvent and the like are separated from the mixed solution of water, organic solvent, and the like, by installing a plurality of tubular separation membranes in which a zeolite membrane is deposited on a surface of a tubular support body and flowing the mixed solution of water and organic material through an outer side of the tubular separation membrane.

Further, there has been known a separation membrane module in which, by setting an outer tube so as to surround the tubular separation membrane with a distance around the tubular separation membrane, and flowing the mixed solution of water and organic solvent through between the tubular separation membrane and the outer tube, the mixed solution passes at a high speed in the vicinity of the tubular separation membrane and is circulated around a whole of the tubular separation membrane with a turbulent flow, whereby separation efficiency is improved (refer to, for example, Patent Document 1).

In the separation membrane module mentioned above, a certain degree of effect of improving the separation efficiency can be recognized, however, the mixed solution has only a little chance of flowing between the tubular separation membrane and the outer tube, and it cannot be said to be sufficient in the case of further increasing separation performance.

On the other hand, in the separation membrane module described above, as a structure for intending to solve a further problem by paying attention to a view point of a strength of the separation membrane in addition to the problem of intending to improve the separation efficiency, there has been known the plurality of tubular separation membranes installed side by side, each structured such that a closed end is formed as a free end, an open end is formed as a fixed end, a tube end part having a screw portion is attached to an outer periphery of the fixed end, and the tube end part is screwed with a tube plate so as to be supported in a cantilever manner (refer to, for example, Patent Document 2).

In the separation membrane module, since the mixed solution of water and organic material flows in a direction which is orthogonal to the tubular separation membrane, a stress is applied to the tubular separation membrane, an extra load is applied to the tubular separation membrane, a seal portion of a joint between the tubular separation membrane and the tube end part, or the like, and there is a possibility that the tubular separation membranes occur a tube vibration, resulting in such problems that a crack is occurred in the tubular separation membrane or a breakage of the seal portion is occurred.

Patent Document 1: WO2004/035182
Patent Document 2: Japanese Unexamined Patent Publication

DISCLOSURE OF THE INVENTION

Problems to be Solved by the Invention

An object of the present invention is to provide a separation membrane module which can further improve separation efficiency and separation performance.

A further object of the present invention is to provide a separation membrane module which can suppress an extra load applied to a tubular separation membrane, a seal portion of a joint between the tubular separation membrane and a tube end part, or the like, caused by a mixed solution of water and organic material receiving a flow, based on the assumption that the separation efficiency and the separation performance are further improved.

Means for Solving the Problems

According to a first aspect of the present invention, there is provided a separation membrane module including: an upper horizontal partition plate positioned in an upper portion within a module main body so as to form an upper fluid channel; and a lower horizontal partition plate positioned in a lower portion within the module main body so as to form a lower fluid channel, wherein a plurality of vertical outer tubes are fixed between the upper horizontal partition plate and the lower horizontal partition plate, a vertical tubular membrane element is put through each of the outer tubes with a gap, an upper end of the gap between each of the outer tubes and the membrane element put there through is joined with an upper fluid channel, a lower end thereof is joined with a lower fluid channel, an upper end opening of each of the membrane elements is open to an outer side of the module main body, a lower end opening thereof is closed, and a vertical partition plate is positioned in any one of the upper fluid channel and the lower fluid channel so as to form an inlet chamber and an outlet chamber.

In the separation membrane module according to the first aspect of the present invention, the separated fluid introduced into the module main body from the inlet chamber is passed from one of the upper fluid channel and the lower fluid channel to the other of the upper fluid channel and the lower fluid channel through the gap between the outer tube and the membrane element, the separated fluid is reversed there, and is turned back to the one of the upper fluid channel and the lower fluid channel through the gap between the other separation membrane and the outer tube, while the separation fluid passing through the membrane element is discharged to an outer side of the module main body, and the separated fluid turned back to the one of the upper fluid channel and the lower fluid channel is discharged from the module main body through the outlet chamber. Accordingly, since it is possible to increase a chance that the mixed solution of water, organic solvent, and the like passes through between the outer tube and the membrane element, it is possible to further improve the separation efficiency and the separation performance.

According to a second aspect of the present invention, there is provided the separation membrane module, wherein a horizontal tube plate is positioned above the upper horizontal partition plate within the module main body, each of the membrane elements is fixedly suspended to the tube plate, the vertical partition plate is positioned within the lower fluid channel in such a manner as to form the inlet chamber and the outlet chamber within the lower fluid channel, a fluid inlet is positioned in such a manner as to be joined with the inlet chamber, a fluid outlet is positioned in such a manner as to be joined with the outlet chamber, and the fluid inlet and the fluid outlet are both in parallel to an axial of the membrane element and are directed upward.

In the separation membrane module according to the second aspect of the present invention, the fluid is fed in parallel to each of the membrane elements. If the fluid is fed in the direction orthogonal to each of the membrane elements, each of the membrane elements is vibrated, and there is a risk that a crack is occurred in each of the membrane elements, and the seal portion is broken. However, such circumstances can be prevented by the separation membrane module according to the second aspect of the present invention.

According to a third aspect of the present invention, there is provided a separation membrane module including: an upper horizontal partition plate positioned in an upper portion within a module main body so as to form an upper fluid channel; and a lower horizontal partition plate positioned in a lower portion within the module main body so as to form a lower fluid channel, wherein a plurality of vertical outer tubes are fixed between the upper horizontal partition plate and the lower horizontal partition plate, a vertical tubular membrane element is put through each of the outer tubes with a gap, an upper end of the gap between each of the outer tubes and the membrane element put there through is joined with an upper fluid channel, a lower end thereof is joined with a lower fluid channel, an upper end opening of each of the membrane elements is open to an outer side of the module main body via the upper fluid channel, a lower end opening thereof is closed, a plurality of first vertical partition plates are positioned side by side in any one of the upper fluid channel and the lower fluid channel so as to form three or more fluid channels including an inlet chamber and an outlet chamber, and in the other of the upper fluid channel and the lower fluid channel, second vertical partition plates are positioned with the number obtained by subtracting one from the number of the first vertical partition plates, and one of the second vertical partition plates is positioned between two of the adjacent first vertical partition plates as seen from a plane.

In the separation membrane module according to the third aspect of the present invention, it is possible to freely adjust the chance of passing through between the outer tube and the membrane element based on a kind, a flow velocity, or the like of the separated fluid, by coming and going the separated fluid introduced into the module main body between the upper fluid channel and the lower fluid channel for a plurality of times.

According to a fourth aspect of the present invention, there is provided the separation membrane module, wherein a horizontal tube plate is positioned above the upper horizontal partition plate within the module main body, each of the membrane separation members is fixedly suspended to the tube plate, the first vertical partition plates are positioned within the lower fluid channel in such a manner as to form three or more fluid channels including the inlet chamber and the outlet chamber within the lower fluid channel, a fluid inlet is positioned in such a manner as to be joined with the inlet chamber, a fluid outlet is positioned in such a manner as to be joined with the outlet chamber, and the fluid inlet and the fluid outlet are both in parallel to an axial of the membrane element and are directed upward.

In the separation membrane module according to the fourth aspect of the present invention, it is also possible to improve durability of the membrane element in the same manner as the separation membrane module according to the second aspect.

According to a fifth aspect of the present invention, there is provided the separation membrane module further including a heating means for heating each of the membrane elements.

In the separation membrane module according to the fifth aspect of the present invention, it is possible to prevent condensation occurred in the case where a vapor is introduced as the separated fluid, in a state in which the membrane element comes to a low temperature such as at the time of startup or the like. Further, in the case where the liquid is introduced as the separated fluid, it is possible to heat latent heat of vaporization which is necessary when the separation fluid passes through the membrane.

According to a sixth aspect of the present invention, there is provided the separation membrane module, wherein the separation membrane is obtained by depositing a zeolite on a surface of a support tube made of ceramics.

Effects of the Invention

According to the present invention, there is provided a separation membrane module which can further improve separation efficiency and separation performance.

Further, according to the present invention, it is possible to suppress an extra load applied to a membrane element.

BEST MODE FOR CARRYING OUT THE INVENTION

Hereinafter, embodiments of the present invention will be described with reference to the drawings.

<First Embodiment>

Figure 1:
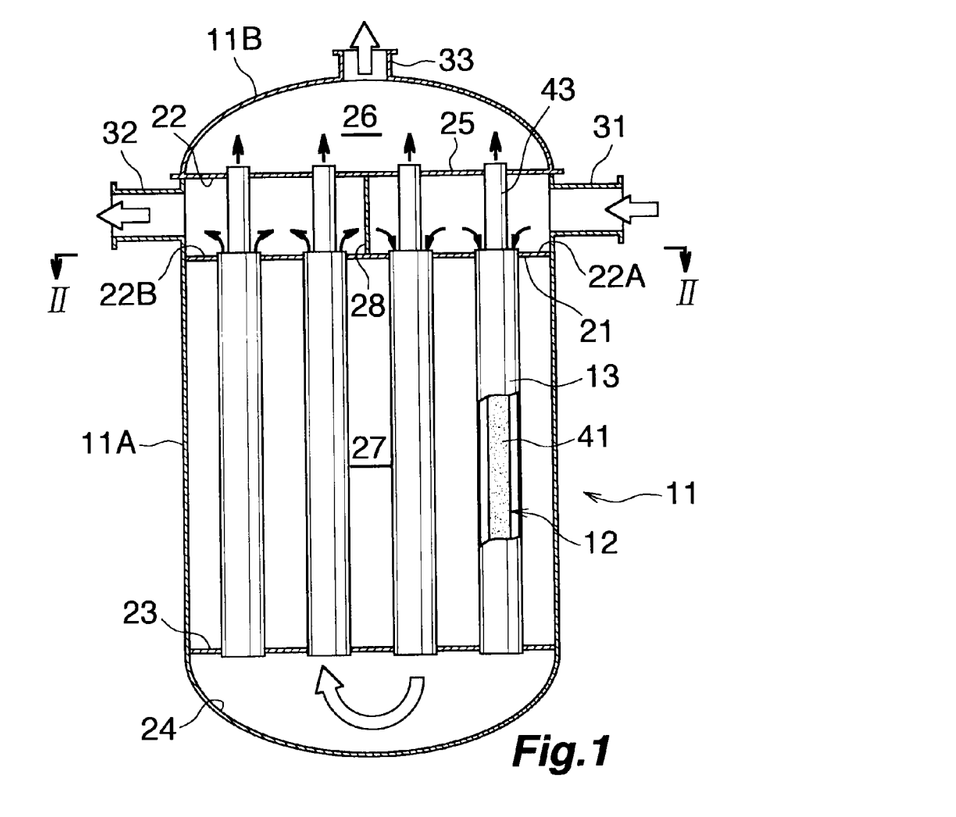
FIG. 1 is a vertical longitudinal cross sectional view of a separation membrane module according to a first embodiment of the present invention.
Figure 2:
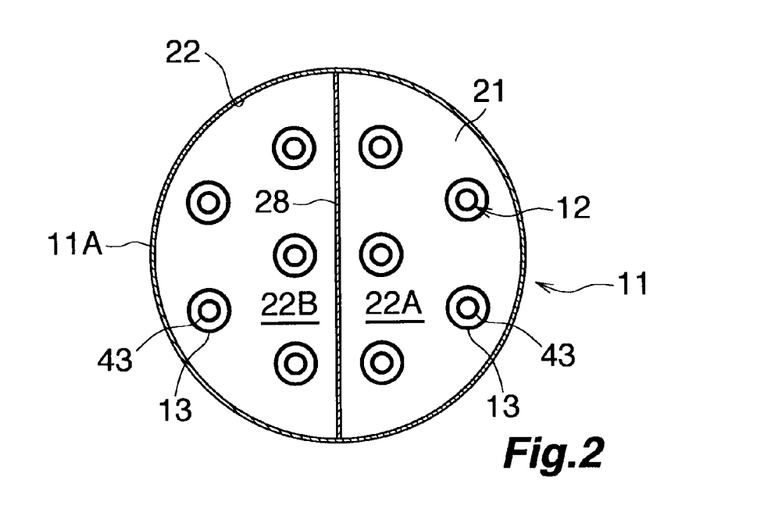
FIG. 2 is a horizontal transverse cross sectional view taken along line II-II in FIG. 1.

With reference to FIGS. 1 and 2, a separation membrane module is provided with a module main body 11 which is constructed as a sealed container, a plurality of vertical outer tubes 13 which are arranged side by side within the module main body 11 at a predetermined distance, and vertical tubular membrane elements 12 of the same number as the outer tubes 13, which are passed concentrically to the respective outer tubes 13 with a gap.

The module main body 11 is constructed by an upper end open vertical cylindrical body 11A, and a lid body 11B which is laid over an upper end of the body 11A. A horizontal tube plate 25 is positioned between the body 11A and the lid body 11B. A discharge chamber 26 is positioned above the tube plate 25 within the module main body 11, and a separation chamber 27 is positioned below the tube plate 25, respectively.

An upper horizontal partition plate 21 is positioned just below the tube plate 25 within the module main body 11, and an upper fluid channel 22 is positioned between the tube plate 25 and the upper horizontal partition plate 21. A lower horizontal partition plate 23 is positioned near a bottom surface within the module main body 11, and a lower fluid channel 24 is positioned below the lower horizontal partition plate 23. A vertical partition plate 28 is positioned within the upper fluid channel 22, whereby an inner side of the upper fluid channel 22 is sectioned into an inlet chamber 22A and an outlet chamber 22B. A fluid inlet 31 is joined with the inlet chamber 22A, and a fluid outlet 32 is joined with the outlet chamber 22B, respectively. Further, a separated fluid discharge port 33 is joined with the discharge chamber 26.

Each of the outer tubes 13 is fixed both the upper horizontal partition plate 21 and the lower horizontal partition plate 23, and joins the upper fluid channel 22 and the lower fluid channel 24.

Each of the membrane elements 12 is constructed by a tubular separation membrane 41 which is constructed by depositing a zeolite on a surface of a support tube made of ceramics, and a vertical connection tube 43 which is connected straightly to an upper end of the separation membrane 41.

An upper end of a gap between each of the outer tubes 13 and the membrane element 12 is joined with the upper fluid channel 22, and a lower end of the gap is joined with the lower fluid channel 24. The connection tube 43 vertically comes across the upper fluid channel 22. An upper end opening of the connection tube 43 is open to the discharge chamber 26. A lower end of the separation membrane 41 is closed by a closure part (not shown).

The separated fluid is introduced to a side of the inlet chamber 22A of the upper fluid channel 22 from the fluid inlet 31. The introduced separated fluid is conducted to the lower fluid channel 24 from the inlet chamber 22A through a gap between the outer tube 13 and the membrane element 12 which exists in an inlet side of the vertical partition plate 28. The separated fluid conducted to the lower fluid channel 24 is reversed within the lower fluid channel 24, and is conducted to the outlet chamber 22B of the upper fluid channel 22 through a gap between the outer tube 13 and the membrane element 12 which exists in an outlet side of the vertical partition plate 28. While the separated fluid is conducted from the upper fluid channel 22 to the lower fluid channel 24, and is reversed there to again turn back to the upper fluid channel 22, the separation fluid passing through the separation membrane 41 is discharged out of the module main body 11 through the discharge chamber 26, and the separated fluid turned back to the upper fluid channel 22 is discharged from the upper fluid channel 22 through the fluid outlet 32.

A description will be given below of second to fourth embodiments. In the second to fourth embodiments, a detailed description of portions corresponding to the first embodiment will not be given by attaching the same reference numerals as in FIGS. 1 and 2.

<Second Embodiment>

Figure 3:
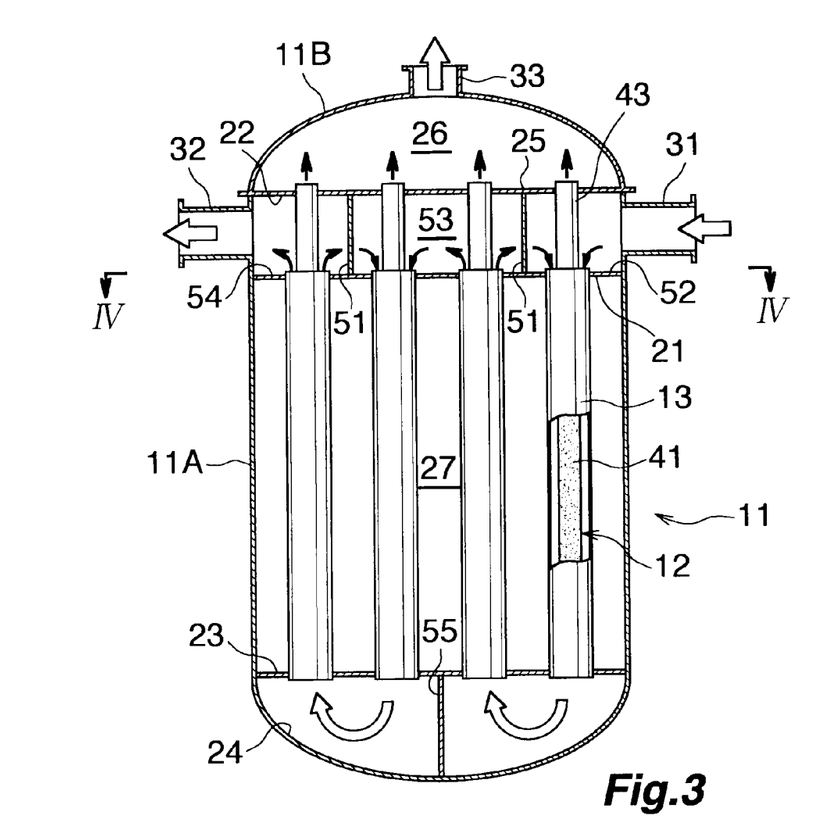
FIG. 3 is a vertical longitudinal cross sectional view of a separation membrane module according to a second embodiment of the present invention.
Figure 4:
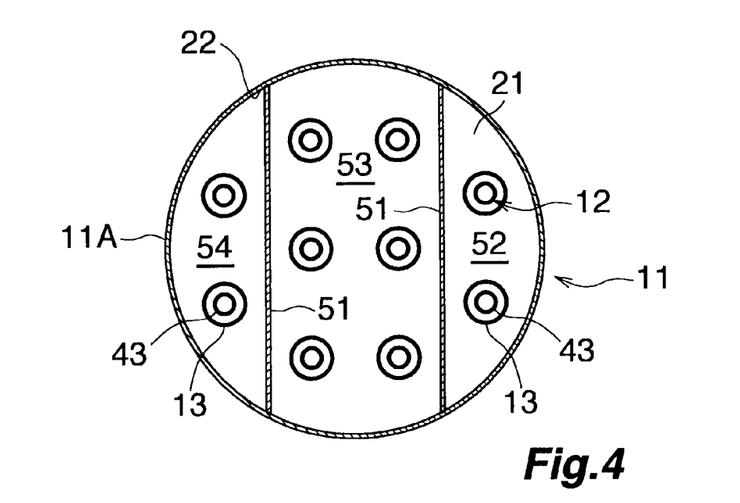
FIG. 4 is a horizontal transverse cross sectional view taken along line IV-IV in FIG. 3.

FIGS. 3 and 4 show the second embodiment.

Two upper vertical partition plates 51 are positioned within the upper fluid channel 22. Accordingly, an inlet chamber 52, an intermediate chamber 53 and an outlet chamber 54 are formed within the upper fluid channel 22 so as to form a line from the fluid inlet 31 to the fluid outlet 32. One lower vertical partition plate 55 is positioned within the lower fluid channel 24. The lower vertical partition plate 55 is positioned below a midpoint between two upper vertical partition plates 51.

All the membrane elements 12 are sectioned into three groups from the fluid inlet 31 to the fluid outlet 32 in their upper end portions, and a gap between the membrane element 12 and the outer tube 13 in each of the groups is joined with each of the inlet chamber 52, the intermediate chamber 53, and the outlet chamber 54. On the other hand, all the membrane elements 12 are sectioned into two groups from the fluid inlet 31 to the fluid outlet 32 in their lower end portions, and a gap between the membrane element 12 and the outer tube 13 in each of the groups is joined with both sides of the lower vertical partition plate 55 of the lower fluid channel 24.

In the example shown in FIGS. 1 and 2, the separated fluid is come and gone once between the upper fluid channel 22 and the lower fluid channel 24, however, in the example shown in FIGS. 3 and 4, the separated fluid is come and gone twice between the upper fluid channel 22 and the lower fluid channel 24, and a further improvement of separation efficiency can be expected.

Further, the number of the upper vertical partition plates 51 may be set to three or more. In this case, the number of the second partition plate 55 can be obtained by subtracting 1 from the number of the upper vertical partition plates 51.

Figure 5:
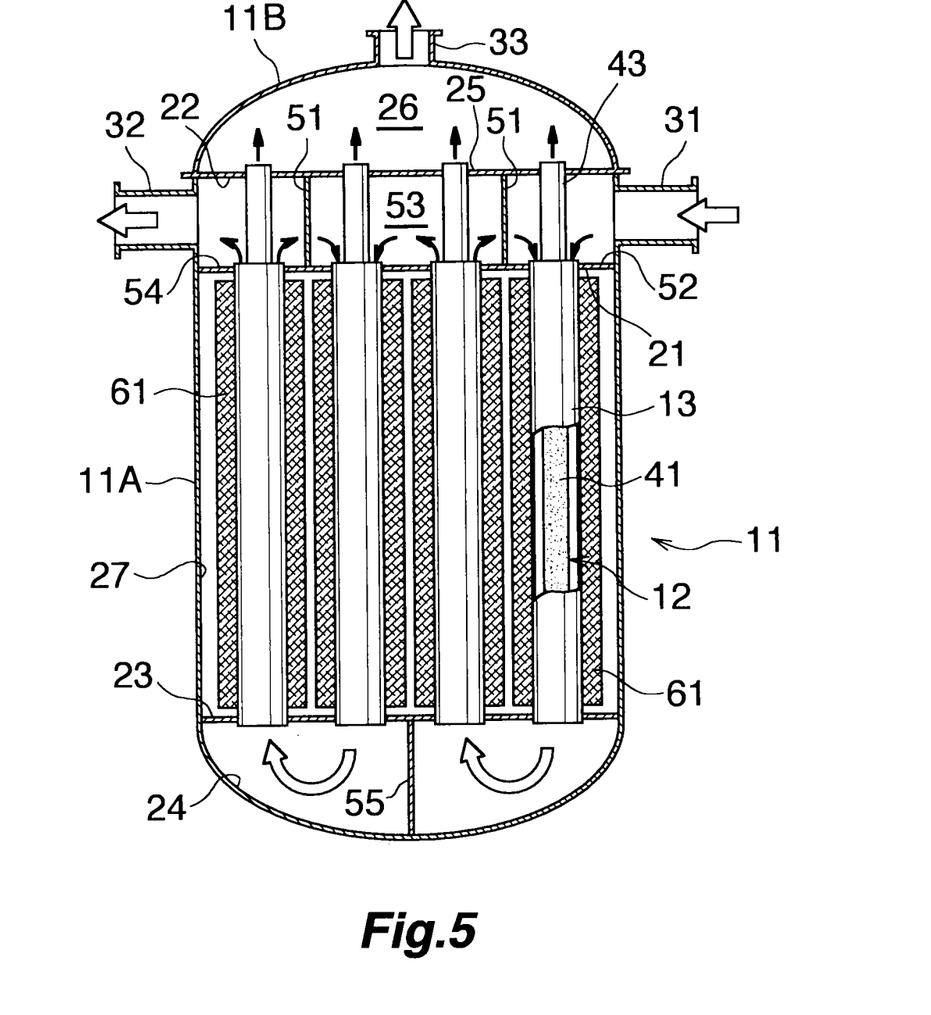
FIG. 5 is a sectional view corresponding to FIG. 3 and shows a modification of the separation membrane module according to the second embodiment of the present invention.

FIG. 5 shows an example which is provided with a heating apparatus 61 for heating the membrane element 12 shown in FIGS. 3 and 4.

The heating apparatus 61 is an electric heater. In place of the electric heater, a heating fluid, for example, a vapor may be introduced and derived with respect to a space between the upper fluid channel 22 and the lower fluid channel 24 within <Third Embodiment>

Figure 6:
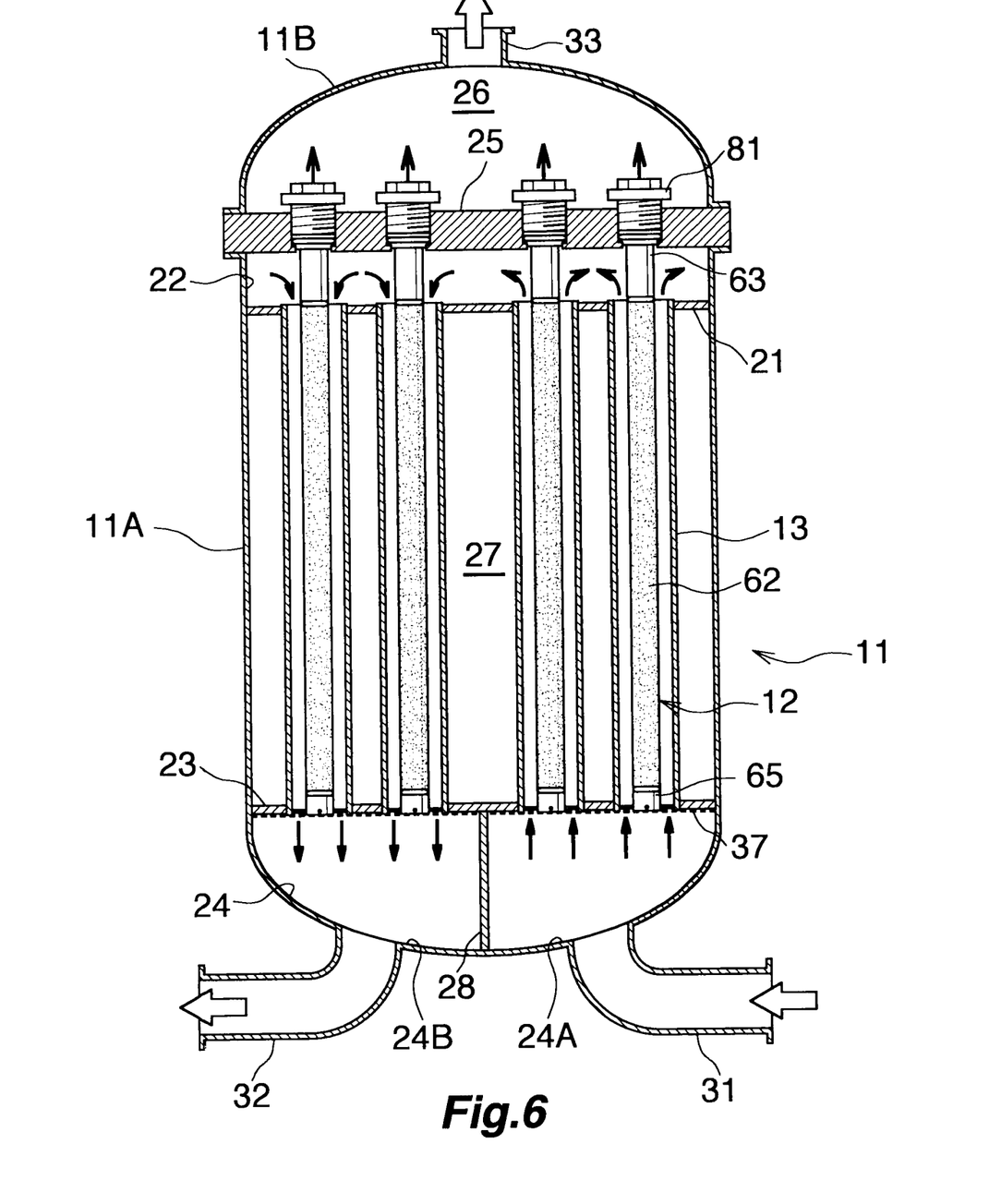
FIG. 6 is a vertical longitudinal cross sectional view of a separation membrane module according to an third embodiment of the present invention.

With reference to FIG. 6 showing the third embodiment, a separation membrane module is provided with a module main body 11, a plurality of vertical outer tubes 13 which are arranged side by side within the module main body 11 so as to be accommodated, and vertical membrane elements 12 which are passed through the respective outer tubes 13, in the same manner as the first embodiment.

The module main body 11 is constructed by an upper end opening vertical cylindrical body 11A, and a dome-shaped lid body 11B which is detachably mounted to a top portion of the body 11A.

A horizontal tube plate 25 is pinched between the body 11A and the lid body 11B. An upper horizontal partition plate 21 is positioned below the tube plate 25, and an upper fluid channel 22 is formed between the tube plate 25 and the upper horizontal partition plate 21. A lower horizontal partition plate 23 is positioned near a underside of the body 11A, and a lower fluid channel 24 is formed below the lower horizontal partition plate 23. A porous plate or a mesh horizontal support plate 37 is covered along a lower surface of the lower horizontal partition plate 23.

A vertical partition plate 28 is positioned within the lower fluid channel 24, whereby the lower fluid channel 24 is sectioned into an inlet chamber 24A and an outlet chamber 24B. A fluid inlet 31 is positioned in such a manner as to be joined with the inlet chamber 24A. A fluid outlet 32 is positioned in such a manner as to be joined with the outlet chamber 24B. A separated fluid discharge port 33 is positioned in the lid body 11B. All the fluid inlet 31, the fluid outlet 32, and the fluid discharge port 33 are directed in parallel to an axis of each of the membrane elements 12, that is, a vertical direction.

Figure 7:
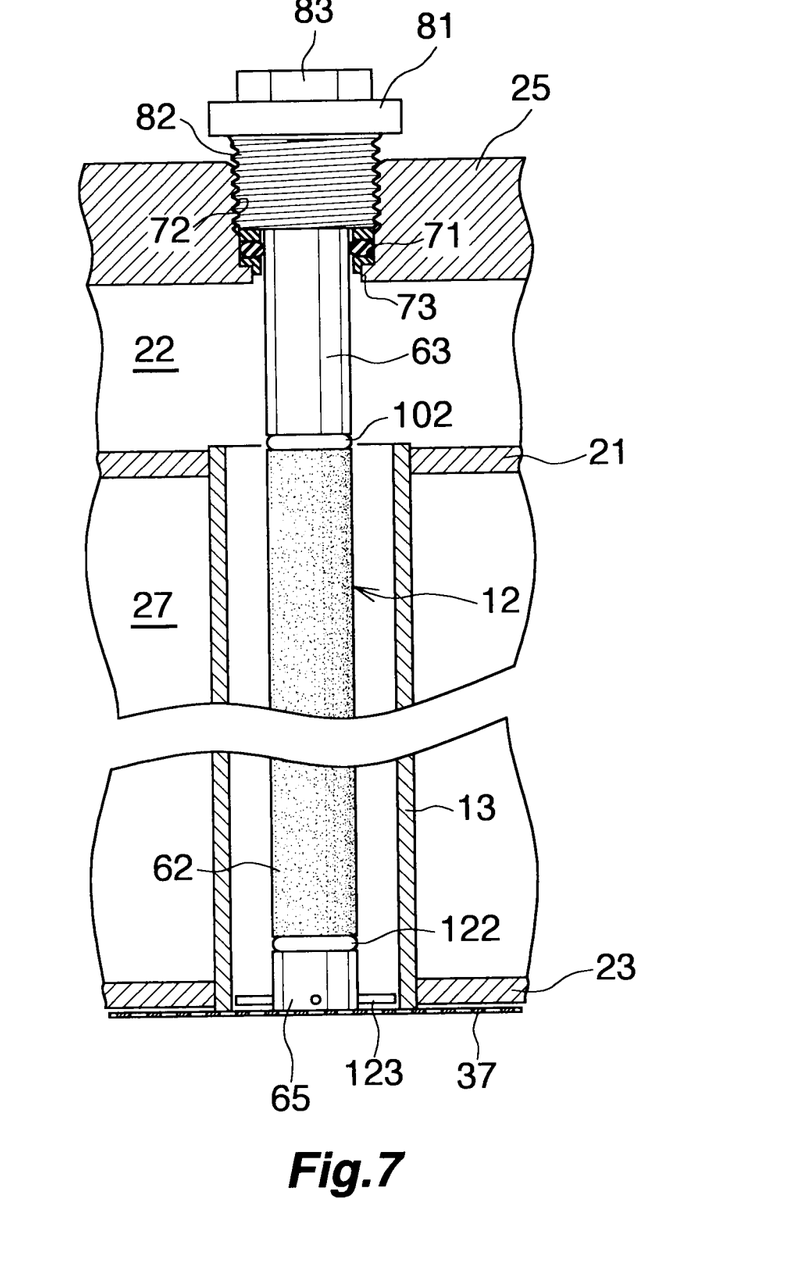
FIG. 7 is a side elevational view showing details of a membrane separation member of the separation membrane module.

Each of the membrane elements 12 is structured, as shown in detail in FIG. 7, such as to be suspended to the tube plate 25, and is constructed by a separation membrane 62 which is obtained by depositing a zeolite on a surface of a vertical tubular support body made of ceramics, a vertical tubular upper end piece 63 which is connected to an upper end of the separation membrane 62 so as to be joined with the membrane 62, and a vertical rod-like lower end piece 65 which is connected to a lower end of the separation membrane 62 so as to close the membrane 62. An outer diameter of the separation membrane 62 is equal to an outer diameter of the upper end piece 63 and an outer diameter of the lower end piece 65.

An upper end of the outer tube 13 is approximately the same level as an upper end of the separation membrane 62. A lower end of the outer tube 13 is approximately the same level as a lower end of the lower end piece 65. An upper end of a gap between the outer tube 13 and the separation membrane 62 is joined with the upper fluid channel 22. A lower end of a gap between the outer tube 13 and the lower end piece 65 is joined with the lower fluid channel 24.

Figure 8:
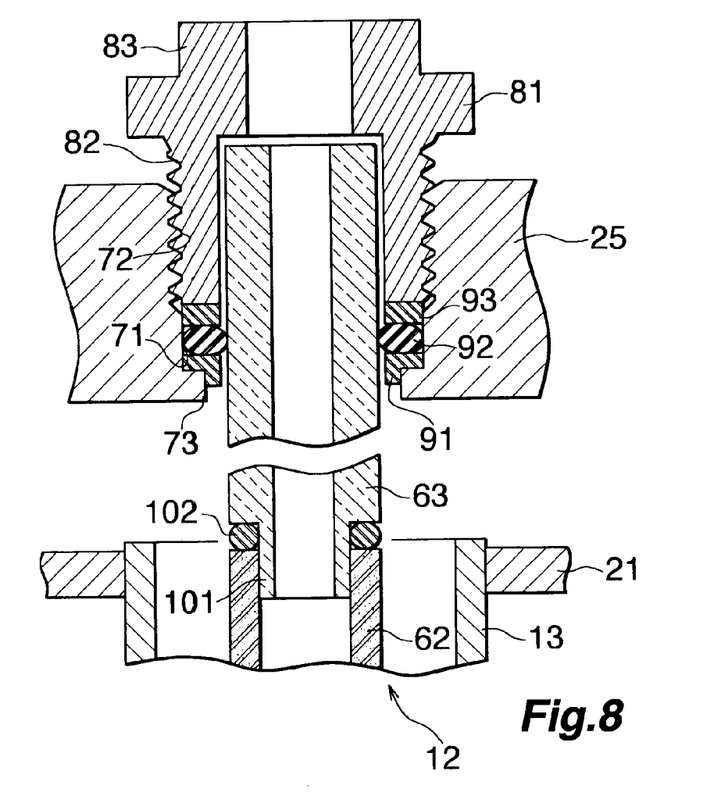
FIG. 8 is a cross sectional view showing in detail a portion near an upper end portion of the membrane element.

Further, with reference to FIG. 8, a vertically penetrating fixing hole 71 having a vertical cylindrical peripheral surface is formed at a position corresponding to each of the membrane elements 12 in the tube plate 25. An inward flange 73 is positioned in a lower end of a peripheral surface of the fixing hole 71, and a female thread 72 is formed above the flange 73. A tubular retention part 81 surrounding an upper end of the upper end piece 63 is inserted to the above of the flange 73 of the fixing hole 71. A male thread 82 screw fitted to the female thread 72 is formed in an outer surface of the retention part 81. A come-off preventing ring 83 with a hexagonal outer surface is fixed to an upper surface of the retention part 81 so as to be coaxial with the retention part 81.

An annular ring receiver 91 having an inverted L-shaped horizontal cross sectional surface is mounted onto the flange 73, and an O-ring 92 is received thereby. A ring-shaped spacer 93 is mounted onto the O-ring 92, and is pressed by a lower end surface of the retention part 81. The O-ring 92 is elastically deformed in such a manner as to be crushed up and down slightly, whereby an inner surface of the O-ring 92 is brought into slidable contact with an outer surface of the upper end piece 63. The structure is made such that the membrane separation member 12 is retained in a suspended state by a sliding resistance between the inner surface of the O-ring 92 and the outer surface of the upper end piece 63. Further, the O-ring 92 is crushed and deformed, whereby a seal is achieved by a contact between the inner surface of the O-ring 92 and the upper end piece 63, and a contact between the outer surface of the O-ring 92 and the fixing hole 71, thereby preventing the separated fluid passing through each of the gaps between the membrane elements 12 and the outer tubes 13, and the fluid passing through the membrane element 12 from being mixed.

Since an upward force is applied to the membrane element 12 by a pressure difference between inside and outside of the membrane element 12, at the time of operating the separation membrane module, the come-off preventing ring 83 holds down the membrane element 12 in such a manner as to prevent the membrane element 12 from coming off upward from the retention part 81.

A lower end surface of the upper end piece 63 is provided with a fitting tube portion 101 which is fitted to an upper end opening of the separation membrane 62. An upper gap is occurred between a lower end surface of the upper end piece 63 and an upper end surface of the separation membrane 62. An upper glass seal ring 102 obtained by compression molding a glass powder is inserted to this upper gap.

Figure 9:
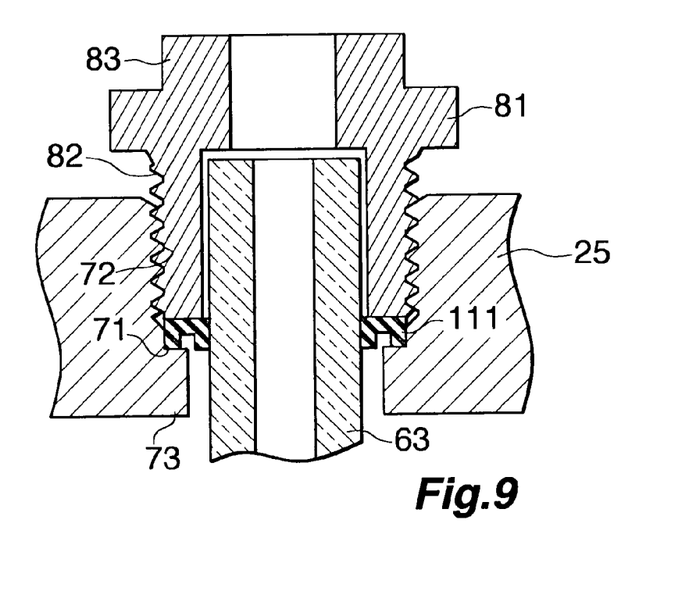
FIG. 9 is a cross sectional view showing a modification of the portion shown in FIG. 8.

FIG. 9 shows an example in which an Omni ring 111 is employed in place of the O-ring 92 shown in FIG. 8. The Omni ring 111 is formed as an approximately U-shaped form in a horizontal cross section, by a Teflon seal. If an upward fluid pressure is applied to the Omni ring 111, the Omni ring 111 is elastically deformed in such a manner that the U-shaped form of the Omni ring 111 expands, and both side surfaces of the Omni ring 111 come into contact with the seal surface.

Figure 10:
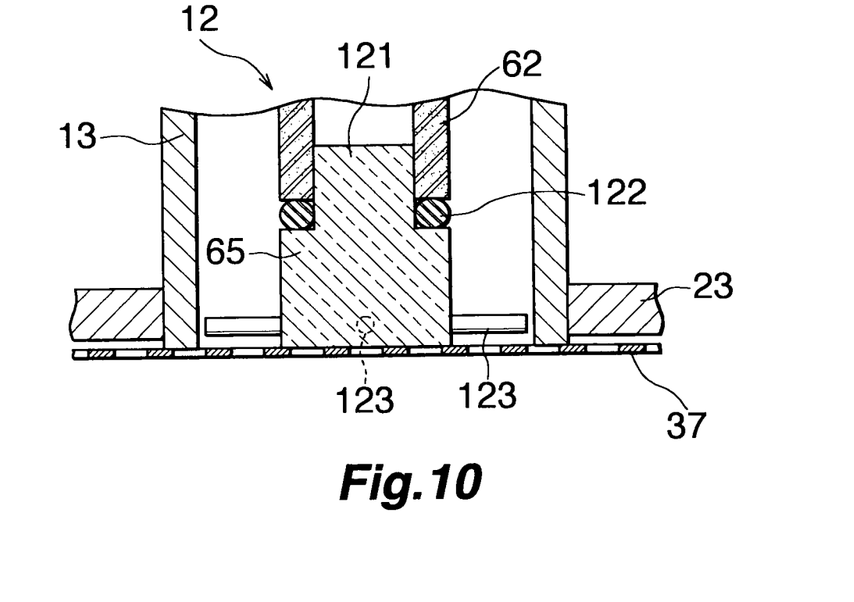
FIG. 10 is a cross sectional view showing in detail a portion near a lower end portion of the membrane element.

The lower end piece 65 is shown in detail in FIG. 10. A fitted round rod 121 fitted to a lower end opening of the separation membrane 62 is fixed on an upper surface of the lower end piece 65. A lower gap is occurred between the lower end of the separation membrane 62 and the upper end surface of the lower end piece 65. A lower glass seal ring 122 which is similar to the upper glass seal ring 62 is inserted to the lower gap.

A plurality of horizontal round rod-like projections 123 are radially fixed on a lower end of an outer surface of the lower end piece 65. A slight gap exists between an inner surface of the outer tube 13 and a leading end surface of the projection 123. The structure is made such as to prevent, by means of the projection 123, an excessive stress applied to the suspended portion in the upper end portion of the membrane element 12 by the vibration of the membrane element 12. Further, by means of the projection 123, it is possible to prevent the inner surface of the outer tube 13 and the membrane element 12 from coming into contact with each other, and it is possible to smoothly insert the membrane element 12 from the outer tube 13 so as to attach, with the slight gap between the inner surface of the outer tube 13 and the projection 123.

The lower end surface of the lower end piece 65 may come into contact with the upper surface of the support plate 37 or may float slightly. It suffices as long as the membrane element 12 prevents the bottom portion of the body 11A from dropping.

Figure 11:
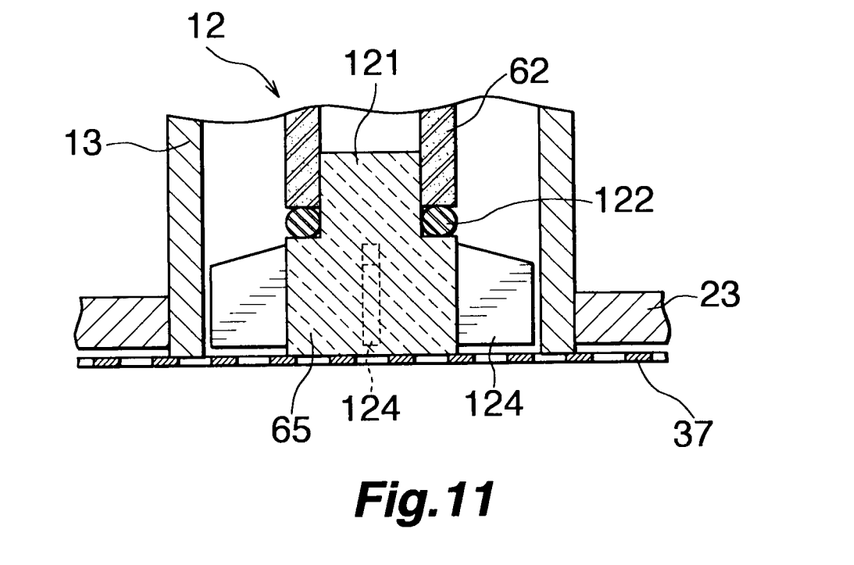
FIG. 11 is a cross sectional view showing a modification of the portion shown in FIG. 10.

FIG. 11 shows an example in which a vertical plate-like projection 124 is employed in place of the horizontal round rod-like projection 123 shown in FIG. 10.

The separated fluid is introduced into the lower fluid channel 24 form the fluid inlet 31. The introduced separated fluid is conducted to the upper fluid channel 22 from the lower fluid channel 24 through the gap between the membrane element 12 and the outer tube 13 which exists in an inlet side of the vertical partition plate 28. The separated fluid conducted to the upper fluid channel 22 is reversed within the upper fluid channel 22, and the separated fluid is conducted to the lower fluid channel 24 through the gap between the membrane element 12 and the outer tube 13 which exists in an outlet side of the vertical partition plate 28, and is derived out of the lower fluid channel 24 through the fluid outlet 32. On the other hand, the fluid passing through the membrane element 12 is discharged out of a top portion of the lid body 11B through the fluid discharge port 33. During this time, since the fluid flows in and out from a direction in parallel to an axis of the membrane element 12, the vibration applied to the membrane element 12 by the flow of the fluid is suppressed to the minimum.

<Fourth Embodiment>

Figure 12:
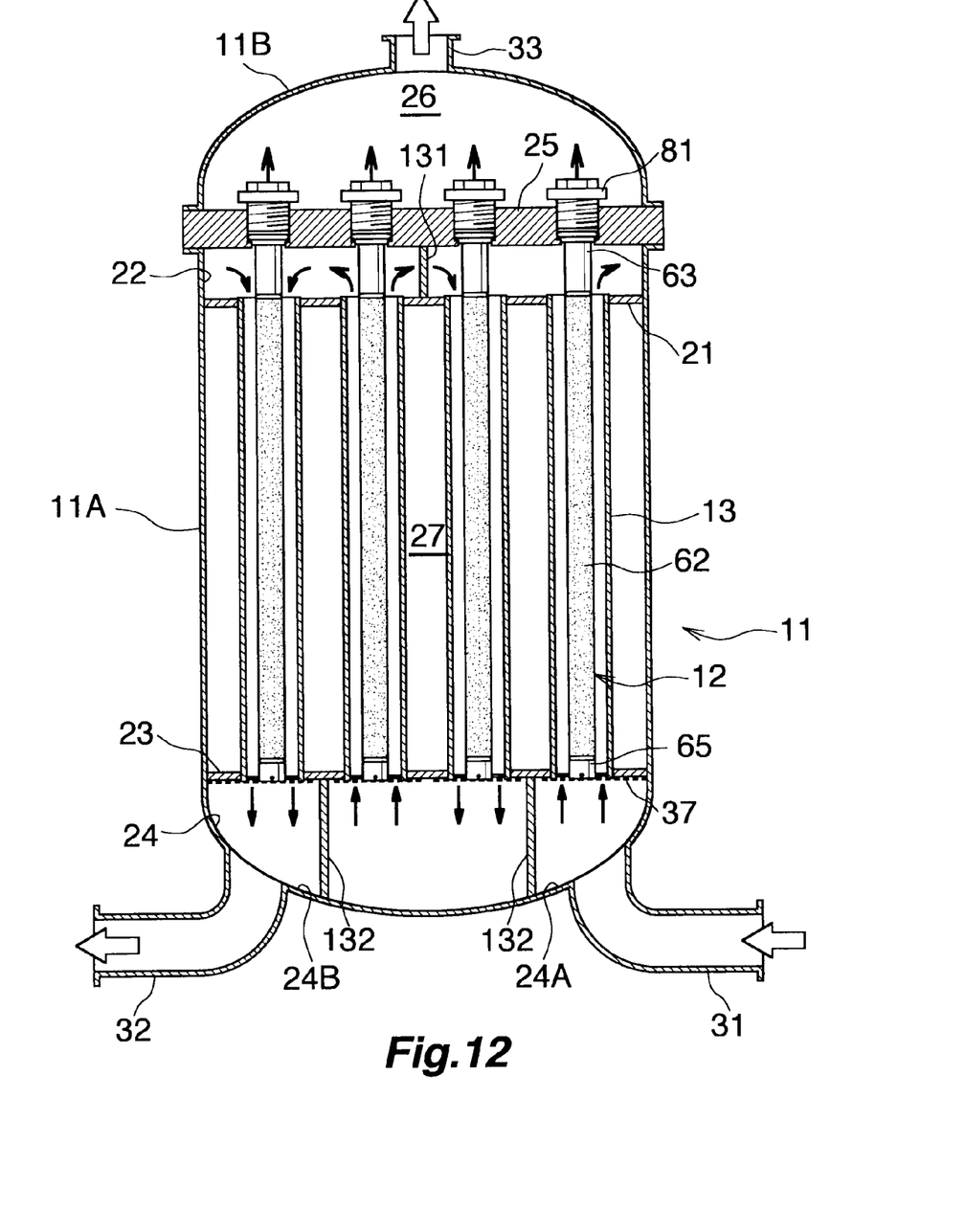
FIG. 12 is a vertical longitudinal cross sectional view of a separation membrane module according to a fourth embodiment of the present invention.

The third embodiment relates to a two-pass type separation membrane module, however, FIG. 12 shows a four-pass type separation membrane module according to the fourth embodiment. In this case, one upper vertical partition plate 131 separating the upper fluid channel 22 into two sections is positioned within the upper fluid channel 22, and two lower vertical partition plates 132 separating the lower fluid channel 24 into three sections are positioned within the lower fluid channel 24. The structures other than the arrangement of the upper vertical partition plate 131 and the lower vertical partition plate 122 are the same as the structure of the two-pass type separation membrane module. Further, a separating operation according to the four-pass type is in proportion to the description in the second embodiment.

In the above, the structures in FIGS. 7 to 11 can be applied to the separation membrane modules in FIGs. 1, 3, and 5.

Industrial Applicability

A separation membrane module according to the present invention is suitable for dehydrating, for example, a mixed solution of water, organic solvent and the like.

DESCRIPTION OF REFERENCE NUMERALS

11 Module main body
12 Membrane element
13 Outer tube
21 Upper horizontal partition plate (for fixing outer tube)
22 Upper fluid channel
22A Inlet chamber
22B Outlet chamber
23 Lower horizontal partition plate (for fixing outer tube)
24 Lower fluid channel
28 Vertical partition plate
31 Fluid inlet
32 Fluid outlet

The invention claimed is:

1. A separation membrane module comprising:
an upper horizontal partition plate positioned in an upper portion within a module main body so as to form an upper fluid channel; and
a lower horizontal partition plate positioned in a lower portion within the module main body so as to form a lower fluid channel, wherein
a plurality of vertical outer tubes are fixed between the upper horizontal partition plate and the lower horizontal partition plate, a vertical tubular membrane element is put through each of the outer tubes with a gap, a horizontal tube plate is positioned above the upper horizontal partition plate within the module main body, each of the membrane elements is fixedly suspended to the tube plate, a discharge chamber is positioned above the tube plate within the module main body, the upper fluid channel is positioned between the tube plate and the upper horizontal partition plate, an upper end of the gap between each of the outer tubes and the membrane element put there through is in communication with the upper fluid channel, a lower end thereof is in communication with the lower fluid channel, an upper end opening of each of the membrane elements is open to the discharge chamber, a lower end opening thereof is closed, and a vertical partition plate is positioned in the upper fluid channel so as to form an inlet chamber and an outlet chamber, a fluid inlet through which fluid is introduced into the module main body and is positioned in such a manner as to be in communication with the inlet chamber, a fluid outlet through which the fluid is removed from module main body and is positioned in such a manner as to be in communication with the outlet chamber, and a separated fluid discharge port is positioned in such a manner as to be in communication with the discharge chamber,
the fluid inlet and the fluid outlet are positioned between the upper horizontal partition plate and the tube plate, and
the module main body includes an open vertical cylindrical body and a lid body which is laid over an upper end of the cylindrical body, the tube plate is positioned between the cylindrical body and the lid body such that the tube plate and the lid body define the discharge chamber, and the discharge chamber is positioned above the inlet chamber and the outlet chamber.

2. The separation membrane module according to claim 1, further comprising heating means for heating each of the membrane elements.

3. The separation membrane module according to claim 1, wherein each of the membrane elements has a separation membrane obtained by depositing a zeolite on a surface of a support tube made of ceramics.

4. The separation membrane module according to claim 1, wherein the fluid discharge port is provided in the lid body.

5. The separation membrane module according to claim 1, wherein the lid body is arcuate.

6. A separation membrane module comprising:
an upper horizontal partition plate positioned in an upper portion within a module main body so as to form an upper fluid channel; and
a lower horizontal partition plate positioned in a lower portion within the module main body so as to form a lower fluid channel, wherein
a plurality of vertical outer tubes are fixed between the upper horizontal partition plate and the lower horizontal partition plate, a vertical tubular membrane element is put through each of the outer tubes with a gap, a horizontal tube plate is positioned above the upper horizontal partition plate within the module main body, each of the membrane elements is fixedly suspended to the tube plate, a discharge chamber is positioned above the tube plate within the module main body, the upper fluid channel is positioned between the tube plate and the upper horizontal partition plate, an upper end of the gap between each of the outer tubes and the membrane element put there through is in communication with the upper fluid channel, a lower end thereof is in communication with the lower fluid channel, an upper end opening of each of the membrane elements is open to the discharge chamber, a lower end opening thereof is closed, a plurality of first vertical partition plates are positioned side by side in the upper fluid channel so as to form three or more fluid channels including an inlet chamber and an outlet chamber, the number of the first vertical partition plates being obtained by subtracting one from the number of fluid channels, and in the lower fluid channel, second vertical partition plates are positioned with a number obtained by subtracting one from the number of the first vertical partition plates, one of the second vertical partition plates is positioned between two of the adjacent first vertical partition plates as seen from a plane, a fluid inlet through which fluid is introduced into the module main body and is positioned in such a manner as to be in communication with the inlet chamber, a fluid outlet through which the fluid is removed from the module main body and is positioned in such a manner as to be in communication with the outlet chamber, and a separated fluid discharge port is positioned in such a manner as to be in communication with the discharge chamber, the fluid inlet and the fluid outlet are positioned between the upper horizontal partition plate and the tube plate, and the module main body includes an open vertical cylindrical body and a lid body which is laid over an upper end of the cylindrical body, the tube plate is positioned between the cylindrical body and the lid body such that the tube plate and the lid body define the discharge chamber, and the discharge chamber is positioned above the inlet chamber and the outlet chamber.

7. The separation membrane module according to claim 6, wherein the fluid discharge port is provided in the lid body.

8. The separation membrane module according to claim 6, wherein the lid body is arcuate.

* * * * *